April 28, 1959  A. HUBER  2,883,862
LIQUID LEVEL INDICATOR
Filed Oct. 17, 1955
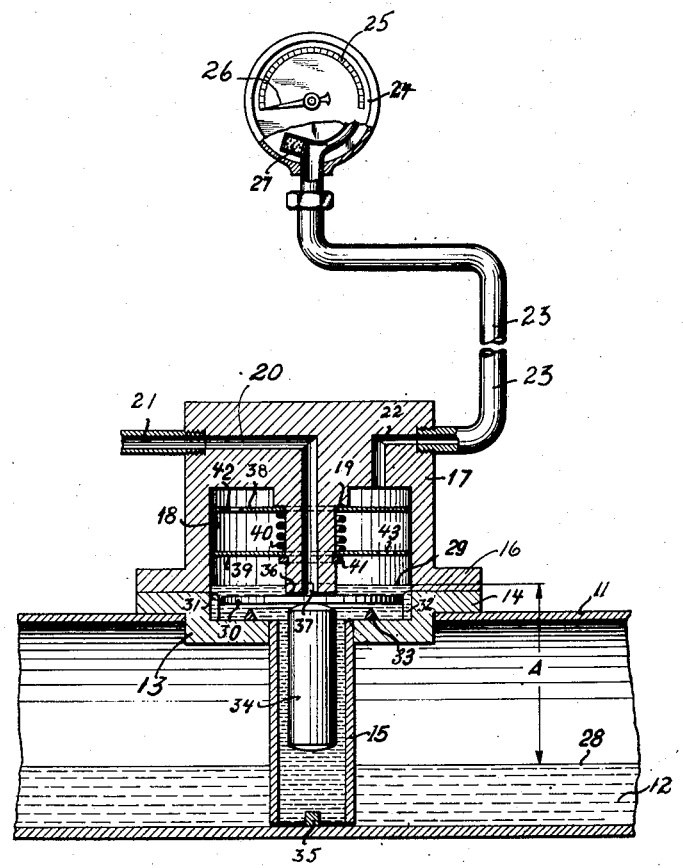
INVENTOR:
ANTON HUBER
BY
Richardson, David and Nordon
HIS ATTY'S

2,883,862
LIQUID LEVEL INDICATOR

Anton Huber, Pleinfeld near Nurnberg, Germany

Application October 17, 1955, Serial No. 540,665

Claims priority, application Germany October 21, 1954

4 Claims. (Cl. 73—303)

The present invention relates to a liquid-level or volume indicator including a novel indicia transmitter. More particularly, it relates to a device suitable for indicating the liquid level in a reservoir, such as the fuel level in the tank of a vehicle powered by an internal combustion engine, the liquid level in turn indicating the volume of liquid in said tank.

It is an object of the present invention to provide a pressure gauge which is effective to indicate the liquid level within a reservoir or tank.

It is a further object of the invention to provide a gauge for indicating the negative pressure or suction required to maintain an auxiliary body of liquid at a predetermined level, the negative pressure indicating the difference in height between the level of the auxiliary body of liquid and the level of liquid in a main reservoir, so that the liquid level in the main reservoir can be read.

Still another object of the invention is to provide a liquid level indicator for a fuel tank, or the like, which indicator is rapid in response and continuously active.

Yet another object of the invention is to provide a liquid level indicator for the fuel tank of a motor vehicle powered by an internal combustion engine, the indicator being actuated by the fuel suction line of the engine.

In accordance with the present invention there is provided a casing defining a chamber superposed on a liquid reservoir such as the fuel tank of a motor vehicle. A riser extends downwardly from the chamber to a location adjacent the bottom of the tank. A pressure gauge communicates with the upper part of said chamber and a suction line, conveniently controlled by the fuel suction line of the engine, communicates with the chamber at a location slightly above the bottom thereof. A one-way valve is provided in the chamber, the valve closing off the riser when inactive and being opened by the negative pressure or suction in said chamber when the engine is running.

As suction is applied to the chamber after starting the engine, the one-way valve is opened and liquid from the tank is drawn up through the riser into the chamber to a predetermined level. The pressure gauge measures the suction or negative pressure prevailing in the chamber which corresponds to the amount of suction required to raise the liquid from the level in the tank to the level in the chamber, i.e., the pressure indicated by the gauge thus corresponds to the difference in height between the liquid levels in the tank and chamber. Since the liquid level in the chamber is predetermined and fixed, the difference in heights is a measure of the absolute height of the liquid in the tank and thus of its volume. By suitable calibration or graduation, the pressure gauge can thus directly provide a reading of the volume of fuel in the tank.

In order to prevent the liquid level in the chamber from rising too far, i.e., beyond the predetermined level, when suction is suddenly applied as upon starting the engine, the chamber is provided with a capillary tube suitable for permitting air to leak into the chamber. This small amount of air together with that taken in from the chamber is drawn off through the suction pipe and can escape through the air intake of the carburetor without untoward effect. The capillary tube is preferably in communication with the pressure gauge line at the indicator so that the leaking air flushes out the line and additionally prevents damage to the gauge.

The one-way valve serves to keep the volume of air sucked in to a minimum, since it prevents the liquid within the riser from falling when no fuel is sucked up therethrough. The fact that the liquid is maintained within the riser aids in making the indicator fast acting.

The one-way valve conveniently takes the form of a plate adapted to move in the chamber between the mouth of the riser and the mouth of the suction line. A float may be provided to facilitate opening of the valve, i.e., rising of the plate.

The downwardly directed mouth of the suction line serves to draw the plate upwardly and also serves as an upward stop for the plate. To prevent the mouth of the suction line from being completely closed off by the plate, the mouth is provided with a slot or the like permitting the suction line to communicate with the chamber even when the plate is at its maximum elevation.

As a further aid in ensuring proper reading and functioning of the apparatus, means are provided to prevent liquid from being drawn up into the pressure gauge line. Suitably, such means takes the form of one or more perforated baffles which avoid liquid splashing while nonetheless permitting the pressure gauge line to be subjected to the reduced pressure prevailing in the chamber.

The invention will now be described more fully with reference to the preferred embodiment shown in the accompanying drawing which, partly in lateral elevation and partly in vertical section, shows the novel indicator arrangement applied to a fuel tank, e.g., in an automobile.

The figure shows a gas tank 11 of an automobile (not shown), containing fuel 12 therein. In an aperture provided in the top of the tank 11 there is seated an annular dished member 13, held in place by a flange 14. The annulus of the member 13 carries a riser 15 extending downwardly into the tank 11 and terminating near the bottom thereof.

A flange 16, carried by a member 17, sits on flange 14, and is secured thereto by welding or the like so that the members 13 and 17 together form a casing defining a chamber 18. A stepped central projection 19 is integral with the member 17 and extends downwardly into chamber 18 to a position somewhat above the riser 15. The projection 19 is provided with a passageway 20 extending therethrough and terminating outside of the chamber, the suction line 21 for the engine communicating with the passageway 20 to transmit to the chamber 18 the negative pressure of the engine, so that fuel 12 is sucked up from tank 11 through riser 15 and into chamber 18.

The chamber 18 is provided with a further passageway or duct 22 extending through the member 17 and opening into the chamber near the top thereof. The conduit 23 of a pressure gauge 24 is in communication with the passageway 22 so that the pressure prevailing within the chamber 18 is transmitted to the pressure gauge. The gauge 24 is provided with a graduated dial 25 and an indicating needle 26 for reading purposes. The dial can conveniently be located on the dashboard of the automobile (not shown). The conduit 23 is in communication with a plug 27 provided with capillary openings for a purpose later to be described. The plug 27 may be a capillary tube per se or may be composed of a material provided with fine capillary openings, such as a porous synthetic material or the like.

With the apparatus so far described, starting of the engine will create a suction in line 21 and thus within the chamber 18 so as to draw gas 12 up through the riser 15 into the chamber. Air leaking through the capillary plug 27 into conduit 23 will enter the chamber and ensure that the liquid rises only to the bottom of passageway 20 in projection 19. The gauge 24 thus will be responsive to the pressure within chamber 18 and the indication will reflect the suction required to raise the fuel the distance A from the gas level 28 within tank 11 to the level 29 within chamber 18. The reading thus will indicate the height A and since the level of the fuel 29 in chamber 18 is predetermined, this indicates the fuel level 28 in the tank 11. By suitable calibration the dial 25 can thus indicate the fuel level within the tank 11 or the volume of fuel in the tank.

The apparatus so far described would permit large quantities of air to be drawn in by suction line 21 as a result of having to evacuate the riser and chamber 18, as well as to take up the leakage through capillary plug 27. In addition, fuel could splash into conduit 23 with possible damage to the gauge 24. Accordingly, additional means are provided to prevent these drawbacks.

Specifically, the riser 15 is provided with a one-way valve composed of a plate 30. Ribs 31, 32 are provided on the inside of member 13 as a guide for the plate during movement. An annular seat 33 is provided on member 13 about the top of riser 15 for the plate 30 in its lowermost position. Thus, when no suction acts on the interior of chamber 18, the plate 30 seals off riser 15 so that the liquid in the riser is prevented from dropping. As a result, the indicator acts faster because the riser does not have to be evacuated.

As an aid in opening the valve, a float 34 is provided in the riser 15 and urges the plate 30 upwardly. To facilitate assembly, the bottom of the riser 15 is provided with a cross-bar 35 which prevents the float 34 from falling out.

The plate 30 will rise in chamber 18 upon application of suction until it abuts against the end 36 of projection 19. Since this would prevent further evacuation of chamber 18, the end 36 of projection 19 is provided with at least one small transverse slot 37 so that the suction is still transmitted to chamber 18 even when the plate 30 is in its uppermost position. The top of slot 37 actually is the effective end of the passageway 20 and thus represents the fixed or predetermined level 29 to which fuel will rise in the chamber 18 and the gauge 24 is responsive to the difference A between the level 29 in chamber 18 and the liquid level 28 in tank 11.

Finally, to prevent splashing of liquid into the conduit 23, annular baffles 38 and 39 are provided on projection 19, the baffles being urged apart by spring 40. A split ring 41 seats in a corresponding groove of projection 19 and baffle 38 abuts against the step of projection 19 while baffle 39 abuts against ring 41. The baffles 38 and 39 are provided with offset perforations 42, 43 respectively, so that any entrained fuel will splash against the baffles and will not be carried into conduit 23. The perforations, however, permit the conduit 23 to be maintained at the pressure prevailing in the chamber 18.

The disadvantages previously noted are thus overcome. Capillary plug 27, in addition to ensuring that the liquid level in the chamber will not rise above the top of slot 37, as a result of its positioning serves to flush out conduit 23 and thus prevent fuel fumes from damaging the gauge as well as preventing clogging of the conduit with dust.

The novel indicator responds quickly and continuously upon activation of the suction line of the vehicle. Because the liquid is maintained within the riser, only little air is sucked out and the indications are reliable and rapid.

The only moving parts are the float 32, the plate 28 and the indicating mechanism of the pressure gauge. The float could be dispensed with and the movement of the plate would still be quite gradual and easy. The pressure gauge can be positioned on the dashboard of the vehicle or elsewhere in a readily accessible location so that repair or replacement is simple. Altogether, the apparatus is of simple and rugged construction. Although breakdown is unlikely, the most sensitive parts of the apparatus can be easily worked on.

Various changes and modifications can be made without departing from the spirit and scope of the present invention and it is intended that such obvious changes and modifications be embraced by the annexed claims.

What is claimed is:

1. An indicator for the level of a liquid within a tank, comprising a casing superposed on said tank and defining a chamber, a riser having an open mouth in said chamber and extending downwardly from said chamber into said tank, suction means communicating with said chamber at a location above said riser for placing said chamber under suction and thereby drawing liquid up into said chamber from said tank through said riser to a predetermined level, and a pressure gauge in communication with said chamber at a location above said suction means, said pressure gauge indicating the pressure prevailing in said chamber, said pressure being a function of the difference between said predetermined liquid level in said chamber and the liquid level in said tank and therefore providing an indication of the liquid level in the tank, and one-way suction actuated valve means extending across the mouth of said riser, said valve means opening upon applying suction to said chamber and closing upon the absence of suction, whereby upon discontinuing the application of suction to said chamber said valve means closes, thus maintaining the liquid within the riser, said one-way valve means including a suction-actuated movable plate disposed to close said mouth, and a float within said riser disposed to engage said plate, said float urging said plate upwardly.

2. An indicator as defined in claim 1, in which said suction means includes a downwardly directed tubular projection terminating above said plate and having a free end serving as an abutment to limit motion of said plate when suction actuated to open said mouth, said free end being provided at its terminal with openings permitting the suction means to be in communication with said chamber even when said plate is in its uppermost position against the free end of said projection, said openings defining the predetermined level of liquid when in said chamber.

3. An indicator for the level of a liquid within a tank, comprising a casing superposed on said tank and defining a chamber, a riser having an open mouth in said chamber and extending downwardly from said chamber into said tank, suction means communicating with said chamber at a location above said riser for placing said chamber under suction and thereby drawing liquid up into said chamber from said tank through said riser to a predetermined level, and a pressure gauge in communication with said chamber at a location above said suction means, said pressure gauge indicating the pressure prevailing in said chamber, said pressure being a function of the difference between said predetermined liquid level in said chamber and the liquid level in said tank and therefore providing an indication of the liquid level in the tank, and perforated baffle means within said chamber between said suction means and said pressure gauge, said baffle means thereby preventing splashing of liquid into said pressure gauge.

4. An indicator as defined in claim 3, in which said baffle means includes a plurality of superposed perforated baffles, the perforations of adjacent baffles being offset.

References Cited in the file of this patent

UNITED STATES PATENTS

| | | |
|---|---|---|
| 1,943,207 | Cummings | Jan. 9, 1934 |
| 2,305,102 | O'Neil | Dec. 15, 1942 |
| 2,320,731 | Hooper | June 1, 1943 |
| 2,668,251 | Kelly | Sept. 7, 1954 |